United States Patent
Marco

(10) Patent No.: US 10,832,368 B2
(45) Date of Patent: Nov. 10, 2020

(54) METHODS AND SYSTEMS FOR NAVIGATING DRIVERS TO PASSENGERS BASED ON TRUSTWORTHINESS RATINGS

(71) Applicant: Lyft, Inc., San Francisco, CA (US)

(72) Inventor: Talmon Marco, Tel Aviv (IL)

(73) Assignee: LYFT, INC., San Francisco, CA (US)

( * ) Notice: Subject to any disclaimer, the term of this patent is extended or adjusted under 35 U.S.C. 154(b) by 496 days.

(21) Appl. No.: 15/492,633

(22) Filed: Apr. 20, 2017

(65) Prior Publication Data

US 2018/0308190 A1 Oct. 25, 2018

(51) Int. Cl.
*G06Q 50/30* (2012.01)
*G06Q 10/06* (2012.01)
*G06Q 30/02* (2012.01)
*G06Q 20/10* (2012.01)

(52) U.S. Cl.
CPC ..... *G06Q 50/30* (2013.01); *G06Q 10/063112* (2013.01); *G06Q 20/10* (2013.01); *G06Q 30/0282* (2013.01)

(58) Field of Classification Search
None
See application file for complete search history.

(56) References Cited

U.S. PATENT DOCUMENTS

| | | | | |
|---|---|---|---|---|
| 2004/0190757 A1* | 9/2004 | Murphy | ................ | G07B 15/00 382/115 |
| 2008/0195428 A1* | 8/2008 | O'Sullivan | .... | G06Q 10/063112 705/6 |
| 2011/0059693 A1 | 3/2011 | O'Sullivan | | |
| 2011/0246404 A1* | 10/2011 | Lehmann | ............... | G06Q 10/02 706/21 |
| 2016/0356615 A1 | 12/2016 | Arata et al. | | |
| 2018/0066947 A1* | 3/2018 | O'Hare | ............. | G01C 21/3415 |

FOREIGN PATENT DOCUMENTS

WO 2017/075437 A1 5/2017

OTHER PUBLICATIONS

European Search Report dated Jun. 8, 2018, on application No. 18167574.5-1222.
Extended European Search Report for EP Application No. 20167825.7 dated May 19, 2020.

* cited by examiner

*Primary Examiner* — Alan S Miller
*Assistant Examiner* — Arif Ullah
(74) *Attorney, Agent, or Firm* — Keller Jolley Preece

(57) ABSTRACT

Methods and systems for navigating drivers to passengers based on trustworthiness ratings are provided. One example method includes receiving, by a transportation system, a request for transportation from a user and determining a trustworthiness rating of the user. The method further includes matching the user to a driver in a pool of drivers based on the trustworthiness rating of the user and dispatching the driver to fulfill the request. The method may further include matching a trusted driver or a driver with a high trustworthiness rating to the user when the request for transportation from the user is a first-time request for transportation or the user has a lower trustworthiness rating. Systems and at least one computer-readable non-transitory media including one or more instructions for performing the above method are also provided.

20 Claims, 6 Drawing Sheets

METHODS AND SYSTEMS FOR NAVIGATING DRIVERS TO PASSENGERS BASED ON TRUSTWORTHINESS RATINGS

TECHNICAL FIELD

This disclosure relates in general to the field of mobile applications and, more particularly, to methods and systems for navigating drivers to passengers based on trustworthiness ratings.

BACKGROUND

A transportation service may utilize a plurality of drivers to fulfill passenger requests for transportation. Unfortunately, the transportation service may experience fraud from a passenger and/or a driver. For example, the transportation service may receive a stolen credit card from a passenger as a method of payment. Additionally, a driver may submit a false claim to the transportation service that that the driver provided transportation to a passenger when the driver did not provide such transportation or falsely claim that the driver provided a longer ride than what the driver actually provided. Furthermore, a driver and a passenger may collude in any number of ways to defraud the transportation service.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In various embodiments, methods and systems for navigating drivers to passengers based on trustworthiness ratings are provided. In one embodiment, a method comprises receiving, by a transportation system, a request for transportation from a user and determining a trustworthiness rating of the user. The method further comprises matching the user to a driver in a pool of drivers based on the trustworthiness rating of the user and dispatching the driver to fulfill the request. The method may further comprise matching a trusted driver or a driver with a high trustworthiness rating to the user when the request for transportation from the user is a first-time request for transportation and/or if the user has a lower trustworthiness rating. Systems and at least one computer-readable non-transitory media including one or more instructions for performing the above method are also provided.

Example Embodiments

Various embodiments of the present disclosure enhance the security associated with a transportation service transaction by assigning trusted drivers to first-time passengers and/or newer passengers. Unfortunately, some first-time or newer transportation service passengers attempt to pay their fare using stolen payment methods (e.g., credit card, debit card, bank account, gift certificate, etc.) after they have received the ride, which results in the transportation company losing revenue. Sometimes, a driver may defraud a transportation company because it is fairly common for a driver to be affiliated with multiple transportation companies, any of which could send a transportation request to the driver at a particular moment. For example, a driver may receive a transportation request from "Company A" and shift the transaction to "Company B" because Company B pays better. Another type of fraud committed by drivers involves a driver taking a real ride from a company that pays less and the driver generating a fake ride (e.g., ordering himself as the driver of the fake ride) from a company that pays more to the same destination, and thus, making more money and getting bonuses for accepting more rides.

This type of fraud becomes easier to commit for the driver with respect to first-time or newer users of Company A because these first-time/newer users are unfamiliar with the protocols implemented by Company A. In another scenario, the driver and the passenger may collude to overcharge for a particular transportation request received from Company A using a stolen payment method. Thus, Company A may lose revenue as a result of fraud committed by a passenger and/or a driver. Therefore, methods and systems for navigating drivers to passengers based on trustworthiness ratings are needed.

Figure 1:
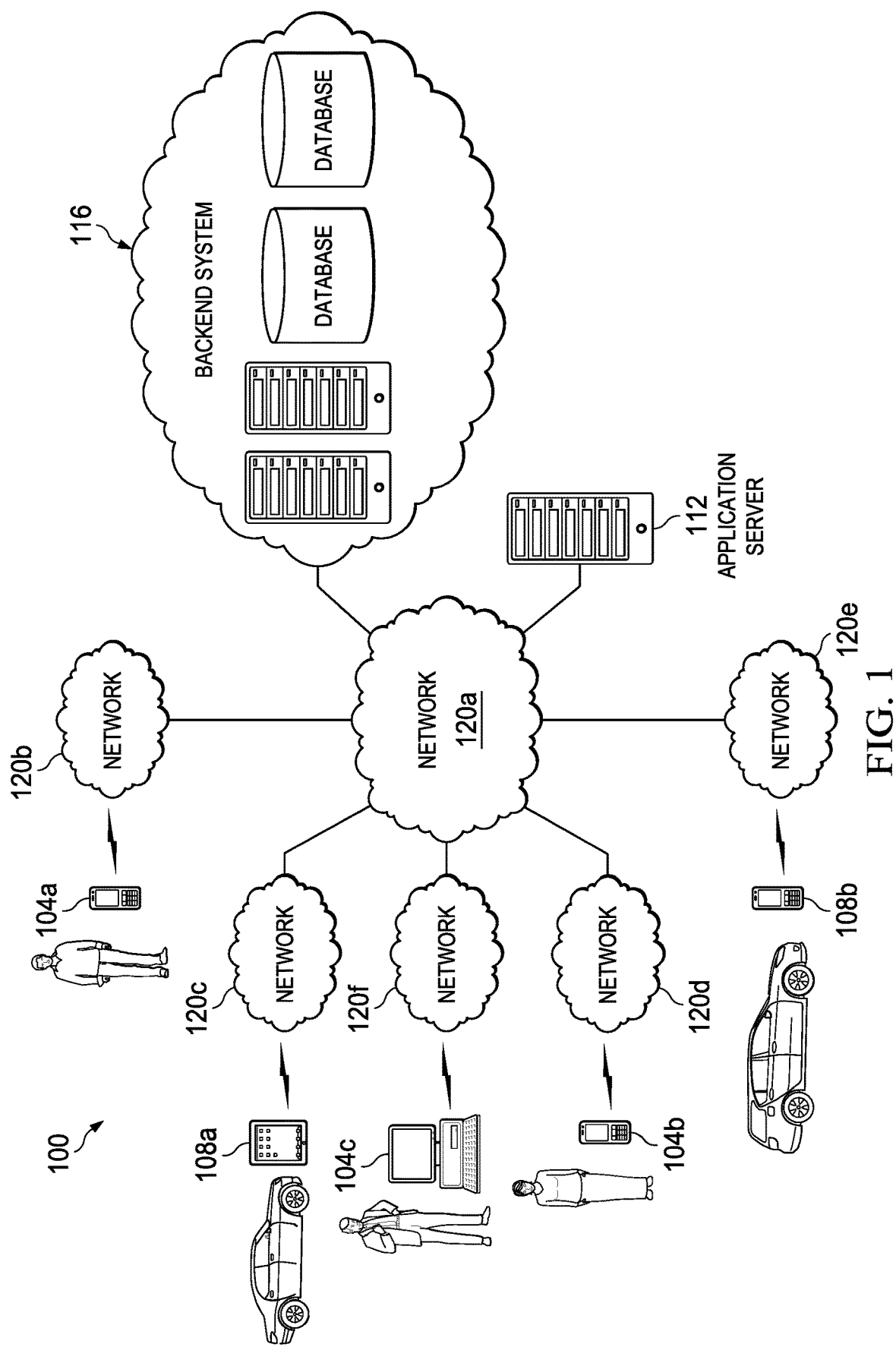
FIG. 1 illustrates a block diagram of a transportation system in accordance with certain embodiments.

FIG. 1 illustrates a block diagram of a transportation system 100 in accordance with certain embodiments. At least in the illustrated embodiment, transportation system 100 comprises a network 120a (e.g., a wireless and/or wired network) coupling a transportation service (represented as a backend system 116), networks of contract drivers 120c and 120e, networks of passengers 120b, 120d, and 120f, and an application server 112 coupled to one another. Although various embodiments may include any number of drivers, passengers, and associated devices, the illustrated embodiment of transportation system 100 depicts three passengers having associated passenger computing devices 104a, 104b, and 104c and two drivers having associated driver computing devices 108a and 108. In other words, the various embodiments of transportation system 100 are not limited by the illustrated embodiment and may include any number of passengers and/or drivers with their respective computing devices 104 and 108.

Backend system 116 may include any electronic computing device(s) known in the art or developed in the future operable to receive transportation requests from passengers (i.e., users) and dispatches a driver to provide the passenger(s) with a ride to a desired destination. As discussed in greater detail below with reference to FIG. 3, backend system 116 facilitates the selection of a driver based on a number of factors including, for example, a trust factor of the passenger and/or a trust factor of the driver to reduce the risk of fraud in the transportation service transaction.

Computing devices 104 and 108 may include any electronic computing device(s) known in the art or developed in the future operable to receive, transmit, process, and/or store any appropriate data. In various embodiments, computing devices 104 and 108 may be mobile devices or stationary devices. Examples of a mobile device include, but are not limited to, laptop computers, tablet computers, smartphones, personal digital assistants, smartwatches, computers integrated with a vehicle, computers integrated with clothing, and/or other devices capable of connecting (e.g., wirelessly) to one or more networks 120. Stationary devices may include, but are not limited to, desktop computers, televisions, or other devices that are not easily portable. Computing devices 104 and 108 may include a set of programs, such as operating systems (e.g., Microsoft Windows, Linux, Android, Mac OSX, Apple iOS, UNIX, or other operating system), applications, plug-ins, applets, virtual machines, machine images, drivers, executable files, and other software-based programs capable of being run, executed, or otherwise used by the respective devices. Each computing device 104/108 may include at least one graphical display and user interface allowing a user to view and interact with applications and other programs of the computing device.

In particular embodiments, a passenger application runs on passenger computing devices 104. The application may allow a user to enter profile or account information (e.g., in connection with a registration with the transportation service) to be utilized by a transportation service. For example, the account information may include a user name and password (or other login credentials), contact information of the user (e.g., phone number, home address), payment method (e.g., credit card numbers, debit card numbers, or bank account numbers and associated information), or car preference information (e.g., what models or color of car the user prefers). The application may further allow a user to request a ride from the transportation service.

In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver. The user may use the application to order a ride based on the specified information.

In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (e.g., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

Once a driver has been selected and has accepted the request to provide a ride, the application may notify the user of the driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected, e.g., through a deduction that the driver's device is not logged into the transportation service through the driver application), or the driver may be "inactive," meaning that the driver only desires to receive particular requests meeting certain exception criteria.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of backend system 116, which may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with transportation system 100. As used in this document, the term computing device, is intended to encompass any suitable processing device. For example, portions of backend system 116 (including backend server 204 illustrated in FIG. 2) or application server 112 may be implemented using servers (including server pools) or other computers. Furthermore, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 may each include one or more processors, computer-readable memory, and/or one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of backend system 116 may be provided by one or more virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating known in the art or developed in the future capable of using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
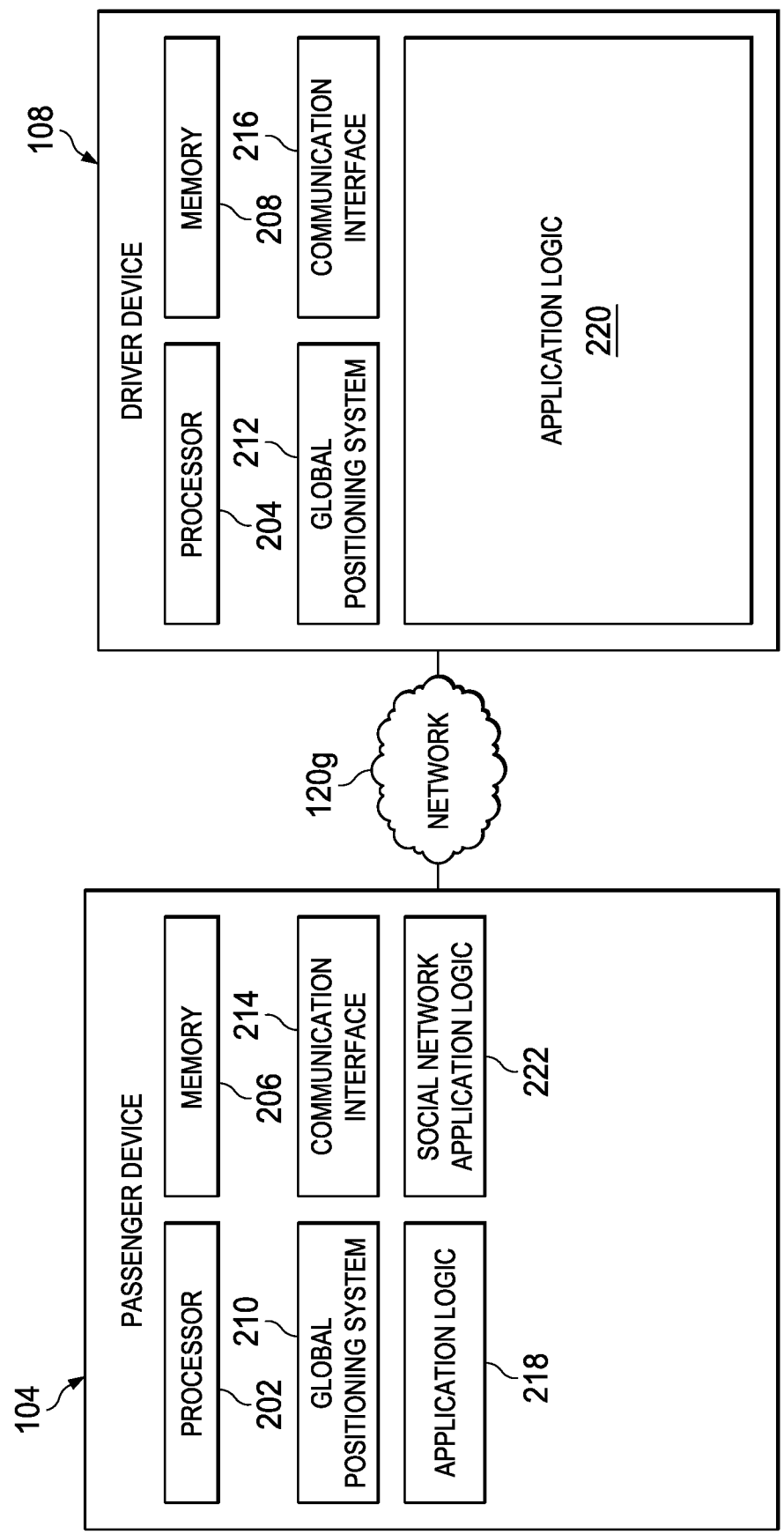
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of transportation system 100 illustrated in FIG. 1 in accordance with certain embodiments. Herein, the terms "passenger computing device" may be used to refer to a computing device used by a subscriber or user that has registered an account with the transportation service or other user that interacts with the transportation service (e.g., by communicating with the transportation service to request transportation), while the terms "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by backend system 116. In the embodiment shown in FIG. 2, the devices 104 and 108 may be communicatively coupled through network 120g, which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processor 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Application logic 218 may include logic providing, at least in part, the functionality of the passenger application described herein. Similarly, application logic 220 may include logic providing, at least in part, the functionality of the driver application described herein. In a particular embodiment, the logic of devices 104 and 108 may include software that is executed by processor 202 and 204. However, "logic" as used herein, may include but not be limited to hardware, firmware, software and/or combinations of each to perform a function(s) or an action(s), and/or to cause a function or action from another logic, method, and/or system. In various embodiments, logic may include a software-controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In a particular embodiment, a user may supply login credentials for a social network system (e.g., FACEBOOK) or other social media system (e.g., TWITTER) to the transportation service through application logic 218. The transportation service (e.g., through backend server) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In a particular embodiment, the social network system allows users to create events, invite others to events, and to indicate attendance at such events. An event may comprise a gathering of a plurality of people for any suitable purpose. Examples of events include concerts, sporting events (e.g., baseball, football, soccer, basketball, hockey, boxing, or other sports), parades, airplane arrivals, community gatherings, or other suitable gatherings. A record for an event stored by the social network system may include any suitable information, such as the name of the event, the type of event, the time and date of the event, the location of the event, a record of users that were invited to the event as well as an indication of whether the users have accepted, declined, or not yet responded to the invitation, or other suitable information about the event.

In various embodiments, the social network system may interact with passenger application logic 218 and/or a backend server 302 (see FIG. 3) to enhance the functionality of these components. As an example, events created in the social network system may be provided to the backend server 302 through an API or other interface to a data store of the social network system. In one embodiment, the social network system may allow backend server 302 to access events independent of a user login associated with a passenger or driver. For example, the social network system may have an arrangement with the transportation service to provide events created in the social network system to the transportation service. In another embodiment, backend server 302 may access the events visible by the transportation service's administrators, passengers, and/or drivers via their respective login credentials to the social network system.

In various embodiments, the social network system may provide any of the functionality listed above with respect to passenger application logic 218 in allowing a user to request a ride from an event and may relay received requests for rides to backend server 302 along with any suitable identifying information about the user to facilitate pickup by a driver. In one embodiment, information associated with requesting a ride from the event may be provided on an event page (e.g., a page that displays the details of the event) viewed by the user using social network application logic 222, a network browser, or other means. The information associated with requesting a ride may include instructions to or an interface (e.g., a link) to request a ride through the social network system, instructions to or a link to download passenger application logic 218 in order to request a ride, an advertisement about the transportation service along with an indication that the transportation service may provide a ride from the event, a coupon for a discounted ride from the event, or other suitable information facilitating the request of a ride from a user (who may or may not already be a customer of the transportation service). In another embodiment, information associated with requesting a ride may be sent to the user by the social network system through the social network application logic 222 (e.g., via a push notification) or other means (e.g., email, text messaging). In various embodiments, the information associated with requesting a ride from the event is provided to the user in response to a determination that the user is at the event.

In various embodiments of the present disclosure, in addition to any combination of the features described above with respect to the driver application, driver application logic 220 may provide additional features for the driver application to enhance the functionality of the transportation service. Driver application logic 220 may also be operable to accept input from the driver regarding whether the driver accepts the offer. Driver application logic 220 may also display information associated with the idle mode offer, such as the time duration of the offer and/or how much time remains for the offer, prospective compensation associated with the offer, accumulated prospective compensation associated with the offer, earned compensation associated with the offer, other information associated with the offer described herein, or any other suitable information associated with the offer.

Figure 3:
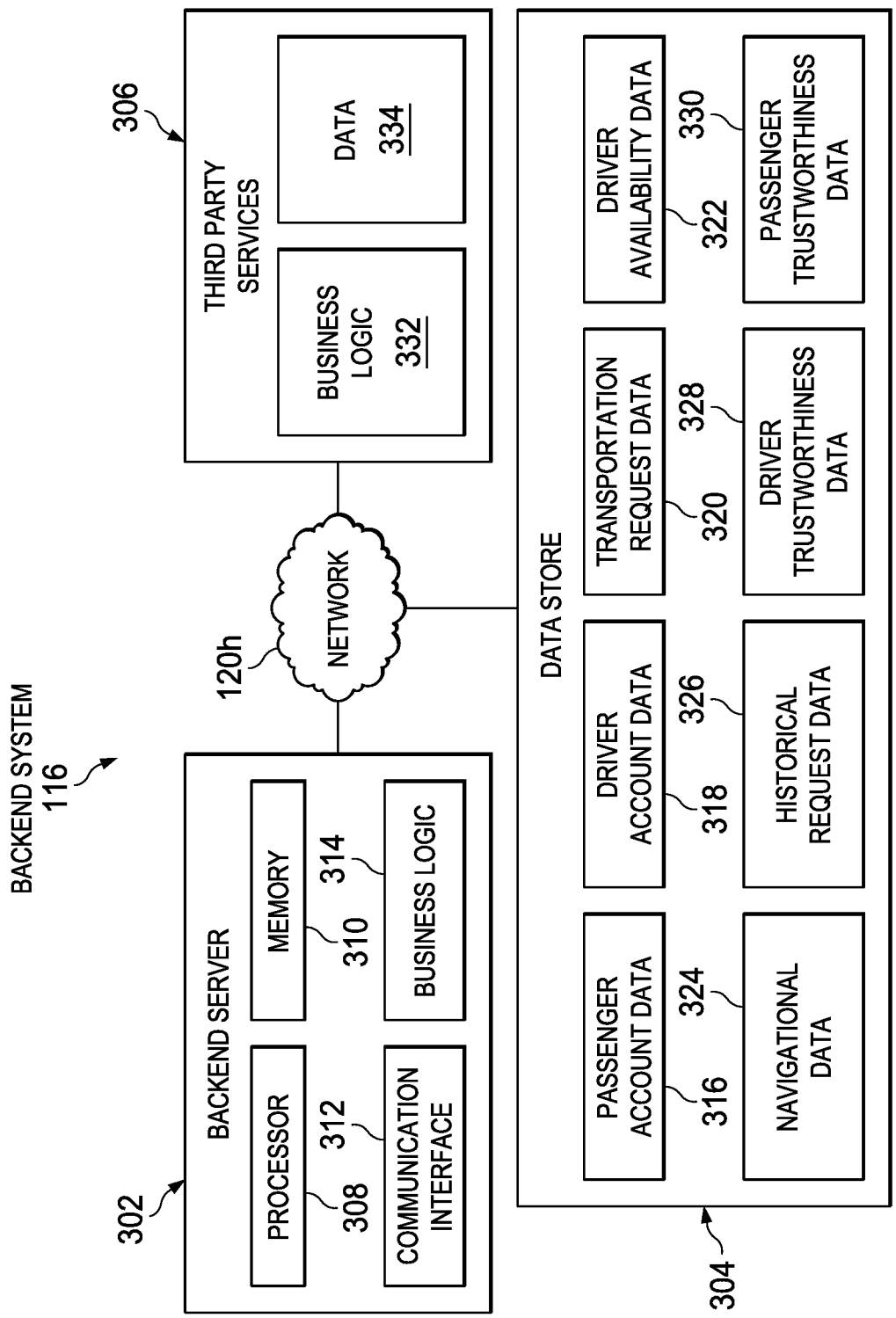
FIG. 3 illustrates a block diagram of a backend system of the system of FIG. 1 in accordance with certain embodiments.

With reference now to FIG. 3, FIG. 3 is a block diagram of one embodiment of backend system 116, which facilitates risk reduction for a transportation service or company in transportation service transactions. Although FIG. 3 depicts a particular implementation of backend system 116, backend system 116 may include any suitable device(s) to facilitate the operation of the transportation service described herein and is not limited to the description provided with reference to FIG. 3. At least in the illustrated embodiment, back end system 116 comprises backend server 302, a data store 304, and third party services 306 coupled to one another via a network 120h (e.g., a wireless and/or wired network). In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers. In various embodiments, one or more of backend server 302, data store 304, and third party services 306 (or portions thereof) may be integrated together on a single device.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor(s) 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB).

In the embodiment depicted, data store 304 includes passenger account data 316, driver account data 318, transportation request data 320, driver availability data 322, navigational data 324, historical request data 326, driver trustworthiness data 328, and passenger trustworthiness data 330. The various data may be updated at any suitable intervals.

Passenger account data 316 may include any suitable information associated with passenger accounts, such as contact information (e.g., real names and addresses), user names and passwords (or other authentication information), payment information (e.g., credit card, debit card, or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request. For each transportation request, an appropriate fare may be assigned according to a distance-weighted continuous pricing function, as disclosed herein.

Driver availability data 322 may comprise information associated with drivers that are available to transport passengers at any given time. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, the number of passengers the driver is able to transport, or other suitable information.

Navigational data 324 may comprise information supporting navigation functions provided by the passenger applications and driver passenger applications. For example, navigational data 324 may comprise map data that may be sent to passenger computing devices 104 and driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip.

In various embodiments, driver trustworthiness data 328 of data store 304 may include driver trustworthiness ratings and/or information describing how driver trustworthiness ratings for each of a plurality of drivers of the transportation service are to be determined at least in part by backend server 302. Driver trustworthiness data 328 may be provided to backend server 302 by any suitable entity, such as an administrator of the transportation service. Driver trustworthiness data 328 may be updated at any suitable time and may be used to generate a driver trustworthiness rating (e.g., a number from 0 to 10) for each driver.

A driver trustworthiness rating, in various embodiments, may be entirely or partially based on the length of time that each driver has been associated or employed by the transportation service. Specifically, a driver may receive varying amounts of points based on categorized increments of time. The length of time may be categorized on a month, a quarter of a year, a year, 5 years, 10 years, or any other suitable length of time categorization with a greater amount of points being assigned to greater lengths of time on a linear or non-linear scale. For example, in a linear model, one point may be awarded for each month, quarter, or year of service. As another example, in a non-linear model, one point may be awarded for the first six months of service, three points awarded for each month of service for months 6-12, and five points a month for each month of service thereafter.

In various embodiments, the driver trustworthiness rating may be based at least partially on points awarded in accordance with a performance evaluation for each driver. Performance evaluation criteria, in various embodiments, may indicate one or more periods that each specifies a time duration over which each driver is evaluated. For example, the performance evaluation period may be a day, a week, a month, a quarter of a year, or other suitable period. A performance evaluation period may be specified using a start time and/or date and an end time and/or date or other time duration. Each performance evaluation period may be associated with a set of performance metric data, which may be the same for all performance evaluation periods or may vary from performance evaluation period to performance evaluation period.

The performance metrics may include awarding points to drivers based on any suitable indications of the performance of the drivers. Example performance metrics may include revenue generated through servicing transportation requests, distance traveled transporting passengers, time spent transporting passengers, an amount of time worked by the driver (e.g., time spent with an available status (i.e., a status indicating availability to accept transportation requests) and/or transporting passengers), feedback scores received from passengers, safety record (e.g., a measure of traffic accidents experienced or traffic tickets received), a percentage of received transportation requests that are accepted and serviced, number of successful trips, and/or other suitable performance metrics.

In various embodiments, a single performance metric (e.g., revenue, an amount of time worked, number of trips, etc.) is used to judge the performance of individual drivers and points are awarded accordingly. In other embodiments, multiple performance metrics (including any suitable combination of two or more performance metrics described herein or other performance metrics) are used to judge performance with points being awarded accordingly.

In embodiments utilizing a single performance metric, a single performance score is calculated and combined with the length of time points. The performance score may be the raw data from the corresponding metric or it may be another value representing a level of performance with respect to the metric. For example, if the performance metric is revenue and the performance score is the raw data, the performance score of an individual driver with respect to the revenue performance metric is the amount of revenue generated by a driver over the performance evaluation period. As another example, if the performance score is another value representing a level of performance with respect to the metric, the raw data may be converted to a value on a performance scale (e.g., a number from 0 to 10). Any suitable scale and conversion methodology may be specified by the performance evaluation criteria data and combined with the length of service points.

When multiple performance metrics are used, the scores associated with each performance metric may be combined to yield a cumulative performance score (if only one performance metric is used, the corresponding performance score is used as the cumulative score for the user), which may be calculated in any manner and combined with the length of service points. For example, the performance metric scores may be added together. As another example, the performance metric scores may be averaged. In some embodiments, the performance evaluation criteria data may specify relative weights for each performance metric, such that more important metrics such as revenue may be factored more heavily in the judgment of performance of a driver or group of drivers. Accordingly, in such embodiments, a weighted average (or other calculation taking into accounts the weights of the various performance metrics) of various scores may be calculated to yield a cumulative performance score for a driver.

In various embodiments, a performance score generated from application of any one of the performance metrics may be adjusted based on any suitable criteria, such as a characteristic associated with a driver, to generate an adjusted score for the driver. Any suitable criteria may be used to adjust a performance score, such as a home location of a driver (i.e., the city in which a driver is based), the length of time a driver has been driving for the transportation service, the type of car of the driver, any of the performance metrics described above (e.g., a score representing the revenue generated by a driver may be adjusted based on customer feedback received for the driver or the percentage of rides the driver accepted), or other suitable criteria. After the performance score for the performance metric is adjusted, the adjusted performance score may be used in the calculation of the cumulative performance score for the driver. Alternatively, a cumulative score may be calculated and the cumulative score itself may be adjusted based on any suitable adjustment criteria. A performance score may be adjusted in any suitable manner. In one embodiment, an adjustment multiplier is associated with the adjustment criteria and when the adjustment criteria apply to a particular driver, the adjustment multiplier being multiplied by the relevant performance score to yield an adjusted performance score. Any other suitable methodology for adjusting performance scores may also be used.

The performance evaluation criteria data may specify how the performance metrics are to be applied to each driver to generate performance points for each driver, which in some embodiments, may also be combined with the length of service points to calculate a driver trustworthiness rating. In one embodiment, the points awarded for performance are weighted equal to the points awarded for length of service. In another embodiment, the points awarded for performance are weighted more heavily than the points awarded for length of service. In yet another embodiment, the points awarded for length of service are weighted more heavily than the points awarded for performance.

In various embodiments, passenger trustworthiness data 330 of data store 304 may include passenger trustworthiness ratings and/or information describing how trustworthiness ratings are to be determined at least in part by backend server 302 for each of a plurality of passengers that utilize the transportation service. Passenger trustworthiness data 330 may be provided to backend server 302 by any suitable entity, such as an administrator of the transportation service. Passenger trustworthiness data 330 may be updated at any suitable time and may be used to generate a passenger trustworthiness rating for each passenger.

A driver trustworthiness rating, in various embodiments, may be entirely or partially based on the length of time that a passenger has been utilizing the transportation service. Specifically, a passenger may receive varying amounts of points based on categorized increments of time. The length of time may be categorized on a month, a quarter of a year, a year, 5 years, 10 years, or any other suitable length of time categorization with a greater amount of points being assigned to greater lengths of time on a linear or non-linear scale. For example, in a linear model, one point may be awarded for each month, quarter, or year of utilizing the transportation service. In an example non-linear model, one point may be awarded for the first six months of service, three points awarded for each month of service for months 6-12, and five points a month for each month of use thereafter. In embodiments in which the passenger trustworthiness rating is partially based on length of time, the passenger trustworthiness rating may further be based at least partially on points awarded in accordance with a valuation for each passenger.

The valuation metrics may include awarding points to passengers based on any suitable indications of the value and/or trustworthiness of the passengers. Example value metrics may include an accumulated amount spent, distance traveled, number of successful trips, average driver rating (i.e., the average rating given to the passenger by drivers servicing transportation requests taken by the passenger), and/or other suitable performance metrics. In some embodiments, points may be awarded based on information (e.g., lack of negative information) received from one or more external evaluation services. The information received from the external evaluation service(s) may provide an evaluation related to the validity of a method of payment (e.g., credit card, debit card, travelers check, check, etc.,), a suspicious payment history (e.g., a passenger uses too many different credit cards), and/or a suspicious transaction history (e.g., a passenger has a history of disputing transactions (which may include legitimate transactions) with the issuer of a payment method (e.g., a credit card may be reported as stolen by the passenger subsequent to a transaction when the credit card was not actually stolen, which results in any payment(s) for transportation services being canceled by the credit card company, resulting in a loss for the transportation service)), among other types of information (or lack of negative information). Accordingly, even more weight or points can be awarded to passengers that have a history of transactions with the transportation service because passenger behavior and/or patterns can be logged and tracked, which results in a passenger becoming more suspicious if the passenger's behavior changes.

In various embodiments, a single value metric (e.g., revenue, miles traveled, number of trips, etc.) is used to judge the value of individual passengers and points are awarded accordingly. In other embodiments, multiple value metrics (including any suitable combination of two or more value metrics described herein or other value metrics) are used to judge value with points being awarded accordingly.

In some embodiments utilizing a single value metric, a single value score is calculated and may be combined with the length of time points. The value score may be the raw data from the corresponding metric or it may be another value representing a level of value with respect to the metric. For example, if the value metric is revenue and the value score is the raw data, the value score of an individual passenger with respect to the revenue value metric is the amount of revenue generated from a passenger during the valuation period. As another example, if the value score is another value representing a level of value with respect to the metric, the raw data may be converted to a value on a scale (e.g., a number from 0 to 10). Any suitable scale and conversion methodology may be specified by the valuation criteria data and combined with the length of use points.

When multiple value metrics are used, the scores associated with each value metric may be combined to yield a cumulative value score (if only one value metric is used, the corresponding value score is used as the cumulative score for the user), which may be calculated in any manner and combined with the length of use points. For example, the value metric scores may be added together. As another example, the value metric scores may be averaged. In some embodiments, the valuation criteria data may specify relative weights for each value metric, such that more important metrics such as revenue may be factored more heavily in the judgment of value of a passenger or group of passenger. Accordingly, in such embodiments, a weighted average (or other calculation taking into accounts the weights of the various value metrics) of various scores may be calculated to yield a cumulative value score for a passenger.

In various embodiments, a value score generated from application of any one of the value metrics may be adjusted based on any suitable criteria, such as a characteristic associated with a passenger, to generate an adjusted score for the passenger. Any suitable criteria may be used to adjust a value score, such as a home location of a driver (i.e., the city in which a passenger resides), the length of time a passenger has been using the transportation service, variety of payment methods (e.g., number of registered credit cards), device (e.g., cellular telephone) identification number, any of the value metrics described above (e.g., a score representing the revenue generated from a passenger may be adjusted based on driver feedback received for the passenger), or other suitable criteria. After the value score for the value metric is adjusted, the adjusted value score may be used in the calculation of the cumulative value score for the passenger. Alternatively, a cumulative score may be calculated and the cumulative score itself may be adjusted based on any suitable adjustment criteria. A value score may be adjusted in any suitable manner. In one embodiment, an adjustment multiplier is associated with the adjustment criteria and when the adjustment criteria apply to a particular passenger, the adjustment multiplier being multiplied by the relevant value score to yield an adjusted value score. Any other suitable methodology for adjusting value scores may also be used.

The valuation criteria data may specify how the value metrics are to be applied to each passenger to generate value points for each passenger, which at least in some embodiments, may then be combined with the length of use points to calculate a passenger trustworthiness rating (e.g., a number from 0 to 10). In one embodiment, the points awarded for value are weighted equal to the points awarded for length of use. In another embodiment, the points awarded for value are weighted more heavily than the points awarded for length of use. In yet another embodiment, the points awarded for length of use are weighted more heavily than the points awarded for value.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server 302 may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by backend server 302 and stored in transportation request data 320. Backend server 302 then retrieves the trustworthiness rating associated with the passenger (user) from passenger trustworthiness data 330.

In various embodiments, if the passenger trustworthiness rating is above a predetermined threshold value or rating (e.g., a passenger trustworthiness rating of "6" or greater), the passenger is deemed a "trusted" passenger and backend server 302 may match the passenger with any available driver. Backend server 302 may access driver availability data 322 to determine one or more drivers that would be suitable to fulfill the request from the trusted passenger. In one embodiment, backend server 302 selects a particular driver based on one or more criteria (e.g., proximity, driver rating, etc.) and sends information associated with the request to the selected driver. The driver indicates whether he accepts or rejects the request via his computing device 108. If the driver rejects the request, backend server 302 selects a different driver and the process is repeated until backend server 302 receives an accepted request from a driver. In another embodiment, backend server 302 may select a plurality of drivers that may fulfill the transportation request and allow the trusted passenger to select one of the drivers. Backend server 302 may proceed to notify the selected driver of the request in a similar manner to that described above. In yet another embodiment, backend server 302 may select a plurality of drivers that may fulfill the transportation request and notify each driver of the transportation request. Backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets one or more preferred characteristics of the transportation request).

In various embodiments, if the passenger has a low trustworthiness rating (e.g., is a newer user or has a passenger trustworthiness rating in the range of "1" to "5") or a passenger trustworthiness rating below the predetermined threshold value, backend server 302 will select an available "trusted" driver (e.g., a driver with a driver trustworthiness rating above a predetermined threshold) to service the passenger. Backend server 302 may access driver availability data 322 to determine one or more trusted drivers that would be suitable to fulfill the request from the passenger. For example, if the passenger threshold value is "5" and the driver threshold value is "7," backend server 302 will select an available driver with a trustworthiness rating of 7 or greater for requests from users with a passenger trustworthiness rating in the range of 1 to 5.

In another embodiment, backend server 302 may implement an inverse-type relationship based on the respective trustworthiness ratings of a passenger and a driver when matching a passenger to a driver. For example, if a passenger has a trustworthiness rating of "2," backend server 302 may select a more trusted driver among a pool of trusted drivers (e.g., a trusted driver that has a trustworthiness rating of "7," "8," "9," or "10"). Similarly, a trusted passenger (e.g., a trusted passenger with a trustworthiness rating of "7") may be matched with a semi-trusted driver (e.g., a driver that has a trustworthiness rating of "3" or higher).

Backend server 302, in various embodiments, may utilize a mathematical function based on the respective trustworthiness ratings of a passenger and a driver when matching a passenger to a driver. For example, the function may determine that the minimum driver trustworthiness rating is equal to 10 minus the passenger rating (i.e., 10−(passenger rating)=minimum driver rating). For a specific example, if the passenger has a trustworthiness rating of 4, then the minimum driver trustworthiness rating would be 6 (i.e., 10−(4)=6).

In one embodiment, backend server 302 selects a particular trusted driver based on one or more criteria (e.g., proximity, driver rating, etc.) and sends information associated with the request to the selected trusted driver. The trusted driver indicates whether he accepts or rejects the request via his computing device 108. If the trusted driver rejects the request, backend server 302 selects a different trusted driver and the process is repeated until backend server 302 receives an accepted request from a trusted driver. In another embodiment, backend server 302 may select a plurality of trusted drivers that may fulfill the transportation request and allow the passenger to select one of the trusted drivers. Backend server 302 may proceed to notify the selected trusted driver of the request in a similar manner to that described above. In yet another embodiment, backend server 302 may select a plurality of trusted drivers that may fulfill the transportation request and notify each trusted driver of the transportation request. Backend server 302 may then allocate the request to one of the trusted drivers based on any suitable criteria. For example, the trusted driver who is the first to accept the request may be assigned to the request. As another example, if multiple trusted drivers accept the request within a given timeframe, the request may be assigned to the most suitable trusted driver (e.g., the driver that is closest to the pick-up location or a trusted driver that has a car that meets one or more preferred characteristics of the transportation request).

If the passenger is a first-time user (e.g., automatically has the lowest passenger trustworthiness rating (e.g., a "0" rating) and/or may automatically be below any predetermined passenger threshold rating), in various embodiments, backend server 302 will select an available trusted driver to service the ride (preferably, a trusted driver with the highest trustworthiness rating of a plurality of drivers that are candidates to service the ride). Backend server 302 may access driver availability data 322 and driver trustworthiness data 328 to determine the available driver with the highest trustworthiness rating. The selected driver indicates whether he accepts or rejects the request via his computing device 108. If the driver rejects the request, backend server 302 selects another available trusted driver with the second highest driver trustworthiness rating and the process is repeated until backend server 302 receives an accepted request from a trusted driver.

In various embodiments, once the transportation request is accepted by a selected driver backend server 302 notifies the passenger that a driver has accepted his request and provides any suitable information associated with the driver to the passenger. For example, backend server 302 may inform the passenger of the driver's current location, model and color of vehicle to expect, estimated time of arrival, and the like information.

Backend server 302 may provide navigation information (e.g., the passenger's current location or other pickup location and directions to the current location of the user or other pickup location) to the driver computing device 108 to direct the driver to the passenger's pickup location. Prior to or upon arriving to pickup the passenger, backend server 302 may provide instructions defining one or more security protocols for the driver to follow based on the trustworthiness rating of the passenger.

If the trustworthiness rating of the passenger is greater than the predetermined threshold (i.e., is a trusted passenger), in various embodiments, the driver may be instructed by backend server 302 to perform a first security protocol (e.g., a lower level security protocol) to ensure that payment is received. With trusted passengers, various embodiments provide greater flexibility with regard to when the passenger is required to present payment for a ride, a maximum amount or distance a ride may entail, and/or the degree to which the passenger must present identification. For example, a trusted passenger may be able to present payment after, during, or before the ride. Furthermore, a trusted passenger may not have a maximum amount or distance or a relatively high maximum amount/distance that the ride may entail. Further still, a trusted passenger may be required to present one form of identification to the driver prior to the trip.

If the trustworthiness rating of the passenger is less than the predetermined threshold (e.g., the passenger has a "not-trusted" rating, a "semi-trusted" rating, or is a new or newer user with a score (e.g., has points awarded based on information received from an external evaluation service, credit card company, phone company, etc.) or is a new user without a score (e.g., a first-time user without information from an external evaluation service, which may automatically include a low or lowest trustworthiness rating), in various embodiments, the driver may be instructed by backend server 302 to perform a second security protocol (e.g., a higher level security protocol) to ensure that payment is received or risk of fraud is reduced. With not-trusted, semi-trusted passengers, or first-time users, various embodiments provide stricter controls with regard to when the passenger is required to present payment for a ride, a maximum amount or distance a ride may entail, and/or the degree to which the passenger must verify identification. For example, a not-trusted, semi-trusted, or first-time passenger may be required to present at least partial payment or full payment prior to starting the ride and/or receive authorization or authentication for a payment method from an issuer of the payment method prior to the ride. Furthermore, a not-trusted, semi-trusted, or first-time passenger may have a maximum amount or distance or a relatively low maximum amount/distance that the ride may entail. Further still, a not-trusted, semi-trusted, or first-time passenger may be required to present two or more forms of identification to the driver prior to the trip and the name on the presented identification must match the name on a presented payment method (e.g., the name on the presented identification must match the name on a credit card, debit card, gift certificate, etc.). Moreover, the driver may be instructed to take a picture of the passenger and transmit the picture to backend server 302 for verification that the user is not on a list of individuals prohibited from engaging the transportation services.

If the not-trusted, semi-trusted, or first-time passenger (with or without points) fails to pass one or more aspects of the second protocol, the backend server 302, in various embodiments, will instruct the driver to further scrutinize the not-trusted, semi-trusted, or first-time passenger by subjectively assessing the trustworthiness of the user. For example, the driver may be instructed by backend server 302 to assess the circumstances (e.g., time of day, IP address of the device used to generate the request, the appearance of the user, actions of the user, etc.), the geographic location of the pick-up location, drop-off location, or both, and the method of payment. The driver is provided with the authority to refuse service if the user does not pass the subjective assessment after failing one or more aspects of the second protocol.

In some embodiments, the backend server 302 will instruct the driver to further scrutinize the not-trusted, semi-trusted, or first-time passenger (with or without points) by subjectively assessing the trustworthiness of the user, even when the not-trusted, semi-trusted, or first-time passenger passes all aspects of the second protocol. For example, the driver may be instructed by backend server 302 to assess the circumstances (e.g., time of day, IP address of the device used to generate the request, the appearance of the user, actions of the user, credit card trustworthiness mobile device global ID, etc.), the geographic location of the pick-up location, drop-off location, or both, and the method of payment. The driver is provided with the authority to refuse service if the user does not pass the subjective assessment after failing one or more aspects of the second protocol.

Upon completion of the first protocol or second protocol (and possibly the subjective assessment), backend server 302, in various embodiments, may provide real-time updates associated with the trip to both the passenger and the driver. Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304 and calculate a new driver trustworthiness rating and/or passenger trustworthiness rating in driver trustworthiness data 328 or passenger trustworthiness data 330, respectively. Although driver trustworthiness data 328 and passenger trustworthiness data 330 are illustrated and described as separate entities, various embodiments provide that driver trustworthiness data 328 and passenger trustworthiness data 330 may form portions of the same entity (e.g., database).

Figure 4:
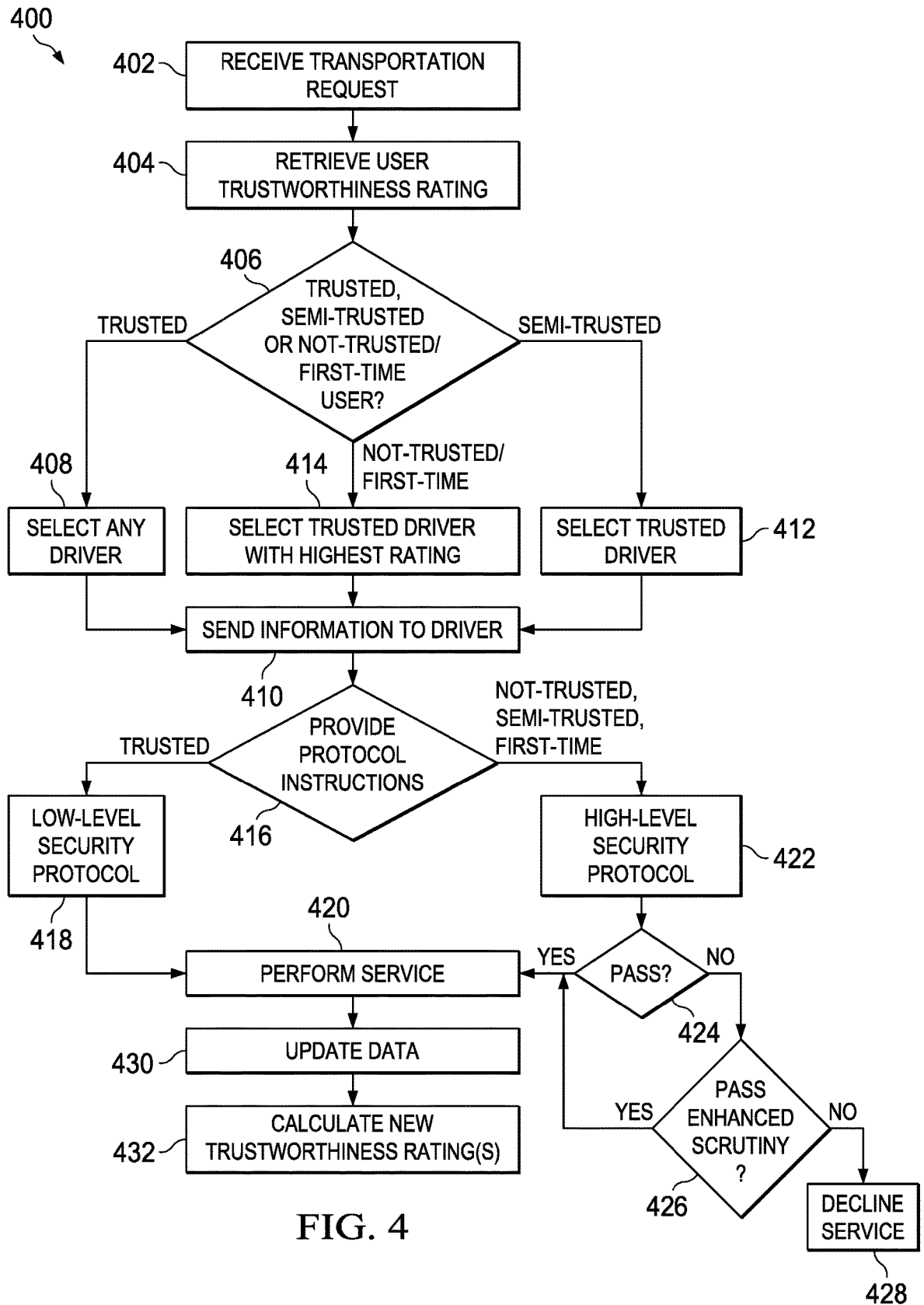
FIG. 4 illustrates a block diagram of one embodiment of a method for navigating drivers to passengers based on trustworthiness ratings in accordance with certain embodiments.

FIG. 4 illustrates an example flow diagram that illustrates a method 400 for navigating drivers to passengers based on trustworthiness ratings in accordance with certain embodiments. Some or all of the operations of method 400 may be performed by any suitable logic of transportation system 100, such as a backend system 116, backend server 302, and/or other components.

At least in the illustrated embodiment, method 400 begins by receiving a request for transportation from a passenger or user (block 402). In various embodiments, backend server 302 may receive the request from the user via a passenger application on the user's device. When a passenger opens the passenger application, the backend server 302 may log the passenger in based on a comparison of authentication information provided by the passenger computing device 104 with authentication information stored in passenger account data 316. The passenger may then request a ride, which is received by backend server 302 and stored in transportation request data 320. Backend server 302 then retrieves the trustworthiness rating associated with the passenger (user) from passenger trustworthiness data 330 (block 404).

Backend server 302 determines if the user is a "trusted" user, a "semi-trusted" user, or a first-time user (block 406). If the passenger trustworthiness rating is above a predetermined threshold value (e.g., above a passenger trustworthiness rating of "5"), the passenger is deemed a "trusted" passenger, while a passenger with a trustworthiness rating at or below the predetermined threshold value (e.g., has a passenger rating in the range of "1" to "5" or is a first-time user with points awarded based on information from an external evaluation service, credit card company, phone company, etc.) is deemed a "semi-trusted" user, or a first-time user and a first-time user (without points) may have a lowest passenger trustworthiness rating (e.g., a passenger trustworthiness rating of "0").

Backend server 302 matches the passenger with any available driver if the passenger is a "trusted" user and accesses driver availability data 322 to determine one or more drivers that would be suitable to fulfill the request from the trusted passenger (block 408). In one embodiment, backend server 302 selects a particular driver based on one or more criteria (e.g., proximity, driver rating, etc.) and sends information associated with the request to the selected driver (block 410).

If the passenger is a semi-trusted user (e.g., has a low trustworthiness rating, is a newer user, or a passenger trustworthiness rating below the predetermined threshold value or score), backend server 302 will select an available "trusted" driver (e.g., a driver with a driver trustworthiness rating above a predetermined threshold) to service the passenger (block 412). Backend server 302 may access driver availability data 322 to determine one or more trusted drivers that would be suitable to fulfill the request from the passenger. In one embodiment, backend server 302 selects a particular trusted driver based on one or more criteria (e.g., proximity, driver rating, etc.) and sends information associated with the request to the selected trusted driver (block 410).

If the passenger is a first-time user or not-trusted user, backend server 302 will select at least an available trusted driver and, preferably, the trusted driver with the highest trustworthiness rating (block 414). Backend server 302 may access driver availability data 322 and driver trustworthiness data 328 to determine the available driver with the highest trustworthiness rating and sends information associated with the request to the selected trusted driver (block 410).

Prior to or upon arriving to pickup the passenger, backend server 302 may provide instructions defining one or more security protocols for the driver to follow based on the trustworthiness rating of the passenger (block 416). If the trustworthiness rating of the passenger is greater than the predetermined threshold (i.e., is a trusted passenger), the driver may be instructed by backend server 302 to perform a first security protocol (e.g., a lower level security protocol) to ensure that payment is received (block 418). With trusted passengers, various embodiments provide greater flexibility with regard to when the passenger is required to present payment for a ride, a maximum amount or distance a ride may entail, and/or the degree to which the passenger must present identification. For example, a trusted passenger may be able to present payment after, during, or before the ride. Furthermore, a trusted passenger may not have a maximum amount or distance or a relatively high maximum amount/distance that the ride may entail. Further still, a trusted passenger may be required to present one form of identification to the driver prior to starting the trip. The driver is then able to provide the ride to the trusted user (block 420).

If the trustworthiness rating of the passenger is less than the predetermined threshold or is a new user (e.g., a first-time user (with or without points)), the driver may be instructed by backend server 302 to perform a second security protocol (e.g., a higher level security protocol) to ensure that payment is received (block 422). With semi-trusted or first-time passengers, various embodiments provide stricter controls with regard to when the passenger is required to present payment for a ride, a maximum amount or distance a ride may entail, and/or the degree to which the passenger must verify identification. For example, a semi-trusted or first-time passenger may be required to present at least partial payment or full payment prior to starting the ride and/or receive authorization or authentication for a payment method from an issuer of the payment method prior to the ride. Furthermore, a semi-trusted or first-time passenger may have a maximum amount or distance or a relatively low maximum amount/distance that the ride may entail. Further still, a semi-trusted passenger or first-time passenger may be required to present two or more forms of identification to the driver prior to the trip and the name on the presented identification must match the name on a presented payment method (e.g., the name on the presented identification must match the name on a credit card, debit card, gift certificate, etc.). In some embodiments, one or more additional security measures and/or actions may be implemented, which can constitute one or more additional security protocols. Backend server 302 may then receive notice whether the semi-trusted or first-time user passed the second security protocol (block 424).

If the semi-trusted or first-time passenger passes one or more aspects of the second protocol, the driver is instructed to provide the user with the ride (block 420). If the semi-trusted or first-time passenger fails to pass one or more aspects of the second protocol, the backend server 302 will instruct the driver to further scrutinize the semi-trusted or first-time passenger by subjectively assessing the trustworthiness of the user and receives notification of whether the passenger passes the higher scrutiny (block 426). For example, the driver may be instructed by backend server 302 to assess the circumstances (e.g., time of day, IP address of the device used to generate the request, the appearance of the user, actions of the user, etc.), the geographic location of the pick-up location, drop-off location, or both, and the method of payment. The driver is provided with the authority to refuse service if the user does not pass the enhanced scrutiny after failing one or more aspects of the second protocol and backend server 302 receives an indication from the driver whether the request for transportation will be fulfilled (block 428). If the user passes the enhanced scrutiny, the driver is instructed to provide the ride (block 420).

Once the passenger's destination location has been reached and the transaction completed, backend server 302 updates passenger account data 316, driver account data 318 transportation request data 320, driver availability data 322, navigational data 324, driver trustworthiness data 328, and/or passenger trustworthiness data 330 as needed (block 430). Furthermore, backend server 302 may calculate a new driver trustworthiness rating (block 432) and/or a new passenger trustworthiness rating (block 434) in driver trustworthiness data 328 or passenger trustworthiness data 330, respectively, based on the completed transaction.

Figure 5:
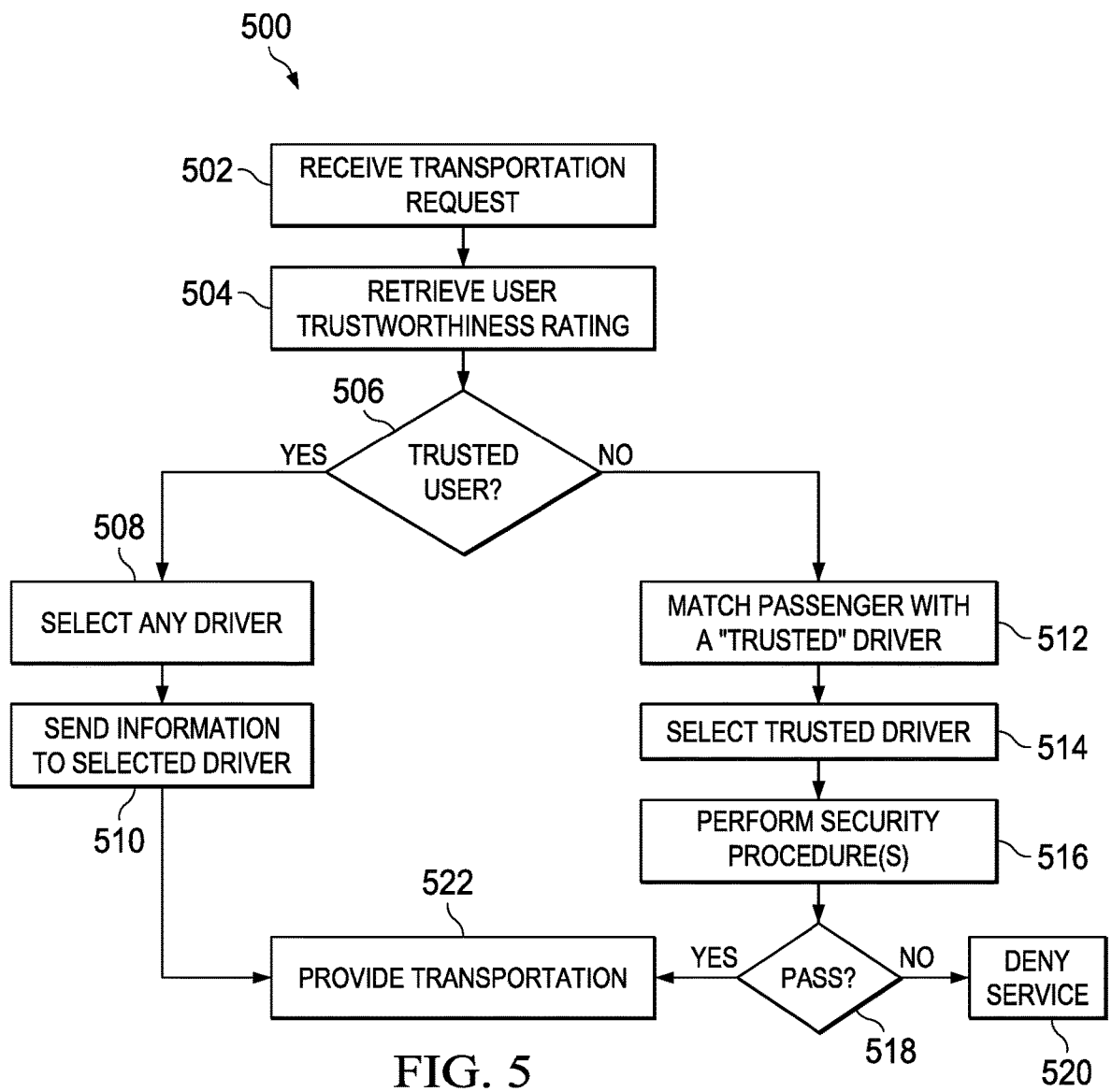
FIG. 5 illustrates a block diagram of another embodiment of a method for navigating drivers to passengers based on trustworthiness ratings in accordance with certain embodiments.

FIG. 5 illustrates an example flow diagram that illustrates a method 500 for navigating drivers to passengers based on trustworthiness ratings in accordance with certain embodiments. Some or all of the operations of method 500 may be performed by any suitable logic of transportation system 100, such as a backend system 116, backend server 302, and/or other components.

At least in the illustrated embodiment, method 500 begins by receiving a request for transportation from a passenger or user (block 502). In various embodiments, backend server 302 may receive the request from the user via a passenger application on the user's device. When a passenger opens the passenger application, the backend server 302 may log the passenger in based on a comparison of authentication information provided by the passenger computing device 104 with authentication information stored in passenger account data 316. The passenger may then request a ride, which is received by backend server 302 and stored in transportation request data 320. Backend server 302 then retrieves the trustworthiness rating associated with the passenger (user) from passenger trustworthiness data 330 (block 504).

Backend server 302 determines if the user is a "trusted" user (block 506). If the passenger trustworthiness rating is above a predetermined threshold value (e.g., above a passenger trustworthiness rating of "5"), the passenger is deemed a "trusted" passenger, while a passenger with a trustworthiness rating at or below the predetermined threshold value (e.g., has a passenger rating in the range of "1" to "5") is not deemed a "trusted" user.

In various embodiments, backend server 302 matches the passenger with any available driver if the passenger is a "trusted" user and accesses driver availability data 322 to determine one or more drivers that would be suitable to fulfill the request from the trusted passenger (block 508). In one embodiment, backend server 302 selects a particular driver based on one or more criteria (e.g., proximity, driver rating, etc.) and sends information associated with the request to the selected driver (block 510). The selected driver then provides the passenger with transportation to the desired destination (block 522).

If the passenger is not deemed a "trusted" user, in various embodiments, backend server 302 accesses driver availability data 322 to determine one or more trusted drivers that would be suitable to fulfill the request from the passenger and matches the passenger with an available "trusted" driver (block 512). In one embodiment, backend server 302 selects a particular trusted driver based on one or more criteria (e.g., proximity, driver rating, etc.) and sends information associated with the request to the selected driver (block 514).

The selected trusted driver is instructed to perform one or more security procedures prior to providing the ride (block 516). In various embodiments, the one or more protocols may provide that the passenger is required to present prepayment or at least partial payment prior to the ride, a maximum amount or distance a ride may entail may be implemented, and/or the passenger must verify identification. For example, the passenger may be required to present at least partial payment or full payment prior to starting the ride and/or receive authorization or authentication for a payment method from an issuer of the payment method prior to the ride. Furthermore, the passenger may have a maximum amount or distance or a relatively low maximum amount/distance that the ride may entail. Further still, passenger may be required to present one or more forms of identification to the driver prior to the trip and the name on the presented identification must match the name on a presented payment method (e.g., the name on the presented identification must match the name on a credit card, debit card, gift certificate, etc.). It is then determined whether the passenger passes the one or more security procedures (block 518).

If the passenger fails to pass one or more aspects of the second protocol, backend server 302 will instruct the driver to deny service to the passenger (block 520). If the passenger passes the security procedure(s), the selected driver then provides the passenger with transportation to the desired destination (block 522).

Figure 6:
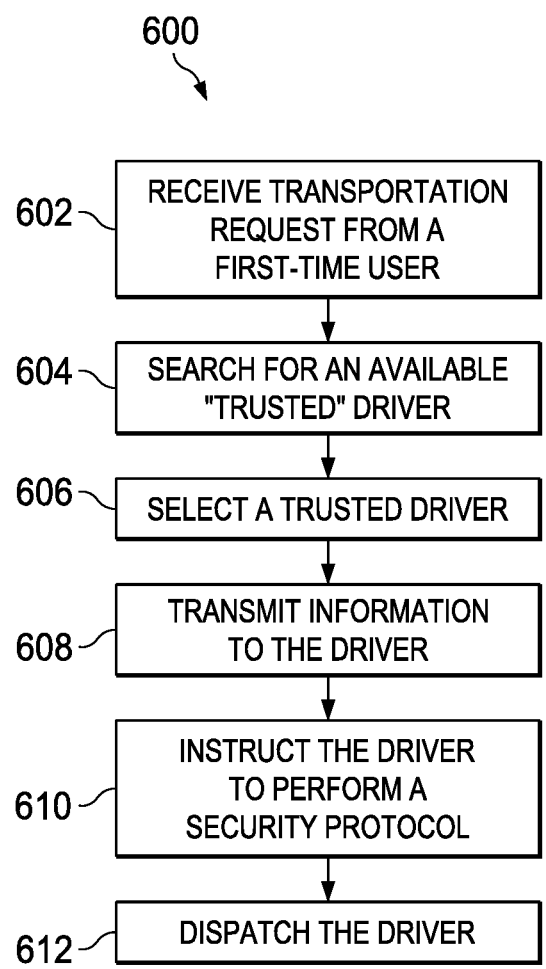
FIG. 6 illustrates a block diagram of an embodiment of a method for navigating drivers to passengers based on trustworthiness ratings in accordance with certain embodiments.

FIG. 6 illustrates an example flow diagram that illustrates a method 600 for navigating drivers to passengers based on trustworthiness ratings in accordance with certain embodiments. Some or all of the operations of method 600 may be performed by any suitable logic of transportation system 100, such as a backend system 116, backend server 302, and/or other components.

At least in the illustrated embodiment, method 600 begins by receiving a request for transportation from a first-time passenger or user (block 602). In various embodiments, backend server 302 may receive the request from the user via a passenger application on the user's device. When a passenger opens the passenger application, the backend server 302 may log the passenger in based on a comparison of authentication information provided by the passenger computing device 104 with authentication information stored in passenger account data 316. The passenger may then request a ride, which is received by backend server 302 and stored in transportation request data 320.

Backend server 302 searches for an available "trusted" driver (e.g., a driver with a trustworthiness rating greater than a predetermined threshold trustworthiness rating) among a candidate pool of drivers (block 604) and selects an available trusted driver from among the pool of candidate drivers (block 606). Information related to the request is transmitted to the driver (block 608) and the driver is instructed to perform a security protocol prior to providing transportation (block 610). The security protocol may require that the passenger present at least partial payment or full payment prior to starting the ride and/or receive authorization or authentication for a payment method from an issuer of the payment method prior to the ride. Furthermore, a maximum amount or distance or a relatively low maximum amount/distance that the ride may be imposed. Further still, the passenger may be required to present one or more forms of identification to the driver prior to the trip and the name on the presented identification must match the name on a presented payment method (e.g., the name on the presented identification must match the name on a credit card, debit card, gift certificate, etc.). Backend server 302 dispatches the available trusted driver to the passenger's location (block 612).

In review, various embodiments provide methods for navigating drivers to passengers based on trustworthiness ratings. One method comprises receiving, by a transportation system, a request for transportation from a user and determining a trustworthiness rating of the user. The method further comprises matching the user to a driver in a pool of drivers based on the trustworthiness rating of the user and dispatching the driver to fulfill the request.

In one embodiment, the trustworthiness rating of the user is determined based on one or more of a length of use of a transportation service, a number of successful trips, an amount spent, number of registered credit cards, device (e.g., cellular telephone) identification number, and/or a driver rating average for the user. In another embodiment, matching the user to the driver is further based on a trustworthiness rating of the driver. In various embodiments, determining the trustworthiness of the user includes determining that the request for transportation is a first-time request from the user and matching the user to the driver includes searching the pool of drivers to determine an available driver with a highest driver trustworthiness rating and selecting the available driver with the highest trustworthiness rating as the driver.

Various embodiments comprise assigning each driver in the pool of drivers a driver trustworthiness rating. In assigning driver trustworthiness ratings, some embodiments comprise assigning trustworthiness points for one or more of: a length of employment, a number of successful trips, an amount of revenue generated, and/or a passenger rating average.

The method, in one embodiment, comprises instructing the driver to implement a first security protocol with respect to the user when the trustworthiness rating of the user is below a predetermined threshold. In various embodiments, instructing the driver to implement the first security protocol comprises instructing the driver to perform at least one of receive prepayment for at least a portion of a fare associated with the request for transportation, implement a predetermined maximum fare amount for the request for transportation, receive authorization or authentication for a payment method from an issuer of the payment method, and/or use at least two forms of identification to verify an identification of the user. In various embodiments, the method further comprises, in response to the user failing to pass at least one portion of the first security protocol, instructing the driver to subjectively assess the trustworthiness of the user based on assessing circumstances surrounding the request for transportation, a geographic location for pick-up, drop-off, or both pick-up and drop-off, and/or a payment method for the request for transportation. One embodiment comprises instructing the driver to implement a second security protocol with respect to the user when the trustworthiness rating of the user is above the predetermined threshold, wherein instructing the driver to implement the second security protocol comprises instructing the driver to perform at least one of use one form of identification to verify an identity of the user and/or verify that payment will be received before, during, or after transportation.

Various embodiments also provide apparatus/systems for navigating drivers to passengers based on trustworthiness ratings. One apparatus comprises a communication interface and at least one processor configured for receiving a request for transportation from a user, determining a trustworthiness rating of the user, matching the user to a driver in a pool of drivers based on the trustworthiness rating of the driver, and dispatching the driver to fulfill the request.

In one embodiment, when matching the user to the driver, the at least one processor is further configured for matching the user and the driver based on a trustworthiness rating of the driver. In some embodiments, when determining the trustworthiness of the user, the at least one processor determines that the request for transportation is a first-time request from the user, and when matching the user to the driver, the at least one processor is further configured for searching the pool of drivers to determine an available driver with a highest trustworthiness rating and selecting the available driver with the highest trustworthiness rating as the driver.

The at least one processor, in various embodiments, is further configured for instructing the driver to implement a higher security protocol with respect to the user when the trustworthiness rating of the user is below a predetermined threshold. In some embodiments, the trustworthiness rating of the user is based on one or more of a length of use of a transportation service, a number of successful trips, an amount spent, or a driver rating average for the user.

Various other embodiments also provide at least one computer-readable non-transitory media comprising one or more instructions that when executed by at least one processor configure the at least one processor to cause the performance of operations for navigating drivers to passengers based on trustworthiness ratings. One set of operations comprise receiving a request for transportation from a user, determining a trustworthiness rating for the user, matching the user to a driver in a pool of drivers based on the trustworthiness rating of the user, and dispatching the driver to fulfill the request. In one embodiment, the operations further matching the user and the driver based on a second trustworthiness rating for the driver such that a lower first trustworthiness rating is matched with a higher second trustworthiness rating when matching the user to the driver.

In one embodiment, when matching the user to the driver, the operations are further configured for matching the user and the driver based on a trustworthiness rating of the driver. In some embodiments, when determining the trustworthiness of the user, the operations determine that the request for transportation is a first-time request from the user, and when matching the user to the driver, the operations are further configured for searching the pool of drivers to determine an available driver with a highest trustworthiness rating and selecting the available driver with the highest trustworthiness rating as the driver.

The operations, in various embodiments, are further configured for instructing the driver to implement a higher security protocol with respect to the user when the trustworthiness rating of the user is below a predetermined threshold. In some embodiments, the trustworthiness rating of the user is based on one or more of a length of use of a transportation service, a number of successful trips, an amount spent, or a driver rating average for the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium such as, for example, non-transitory computer-readable signal medium or a non-transitory computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Computer code embodied on a computer-readable medium may be transmitted using any appropriate medium, including but not limited to wireless, wired, optical fiber cable, infrared, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made through an external computer (for example, through the Internet using an Internet Service Provider).

The flowcharts and/or block diagrams in the above figures illustrate the architecture, functionality, and operation of possible implementations of systems, methods and computer program products according to various embodiments of the present invention. In this regard, each block in the flowcharts and block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Although the invention has been described with respect to particular embodiments, such embodiments are for illustrative purposes only and should not be considered to limit the invention. Various alternatives and changes will be apparent to those of ordinary skill in the art upon reading this application.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke subsection (f) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    receiving, by a processing device of a transportation system from a passenger computing device associated with a user, a transportation request comprising a pickup location;
    generating, by the processing device, a trustworthiness rating of the user by identifying, from a data store, passenger trustworthiness data indicating a length of time that the user has been using the transportation system, wherein generating the trustworthiness rating of the user is based on the passenger trustworthiness data and on the length of time that the user has been using the transportation system;
    matching, by the processing device, the user to a driver of a pool of drivers based on the trustworthiness rating of the user;
    transmitting, by the processing device to a driver computing device associated with the driver, navigational data to direct the driver to the pickup location; and
    transmitting, by the processing device to the driver computing device, instructions to cause one or more security procedures to be performed based on the trustworthiness rating of the user, wherein the transportation request is to be fulfilled responsive to the user passing the one or more security procedures.

2. The method of claim 1 wherein the passenger trustworthiness data further indicates one or more of a total distance the user has traveled with the transportation system, a number of successful trips the user has taken with the transportation system, or an average rating given to the user by drivers of the transportation system.

3. The method of claim 1, wherein matching the user to the driver is further based on a trustworthiness rating of the driver.

4. The method of claim 1, wherein:
    generating the trustworthiness rating of the user includes determining that the transportation request is a first-time transportation request from the user; and
    matching the user to the driver includes:
        searching the pool of drivers to determine an available driver with a highest driver trustworthiness rating, and
        selecting the available driver with the highest trustworthiness rating as the driver.

5. The method of claim 1 further comprising:
    assigning each driver in the pool of drivers a driver trustworthiness rating based on one or more of: a corresponding length of employment, a corresponding number of successful trips, a corresponding amount of revenue generated, or a corresponding passenger rating average.

6. The method of claim 1 further comprising:
    determining a trustworthiness rating for the driver, wherein matching the user to the driver is further based on the trustworthiness rating for the driver.

7. The method of claim 1, wherein transmitting the instructions to cause the one or more security procedures to be performed comprise:
    instructing the driver to implement a first security protocol with respect to the user responsive to the trustworthiness rating of the user not meeting a predetermined threshold; and
    instructing the driver to implement a second security protocol with respect to the user responsive to the trustworthiness rating of the user meeting the predetermined threshold.

8. The method of claim 7, wherein instructing the driver to implement the first security protocol comprises instructing the driver to perform at least one of:
- receive prepayment for at least a portion of a fare associated with the transportation request;
- implement a predetermined maximum fare amount for the transportation request;
- receive authorization or authentication for a payment method from an issuer of the payment method; or
- use at least two forms of identification to verify an identification of the user.

9. The method of claim 7 further comprising, in response to the user failing to pass at least one portion of the first security protocol, instructing the driver to subjectively assess trustworthiness of the user based on at least one of:
- circumstances surrounding the transportation request;
- at least one of the pickup location or a destination location; or
- a payment method for the transportation request.

10. The method of claim 7, wherein instructing the driver to implement the second security protocol comprises instructing the driver to perform at least one of:
- use one form of identification to verify identity of the user; or
- verify that payment will be received before, during, or after transportation.

11. An apparatus comprising:
a memory; and
a processing device coupled to the memory, wherein the processing device is to:
- receive, from a passenger computing device associated with a user, a transportation request comprising a pickup location;
- generate a trustworthiness rating of the user by identifying, from a data store, passenger trustworthiness data indicating a length of time that the user has been using a transportation system, wherein generating the trustworthiness rating of the user is based on the passenger trustworthiness data and on the length of time that the user has been using the transportation system;
- match the user to a driver of a pool of drivers based on the trustworthiness rating of the user; and
- transmit, to a driver computing device associated with the driver, navigational data to direct the driver to the pickup location; and
- transmit, to the driver computing device, instructions to cause one or more security procedures to be performed based on the trustworthiness rating of the user, wherein fulfill the transportation request is to be fulfilled responsive to the user passing the one or more security procedures.

12. The apparatus of claim 11, wherein the processing device is to match the user to the driver further based on a trustworthiness rating of the driver.

13. The apparatus of claim 11, wherein:
to determine the trustworthiness rating of the user, the processing device further determines that the transportation request is a first-time request from the user; and
to match the user to the driver, the processing device is further to:
- search the pool of drivers to determine an available driver with a highest trustworthiness rating; and
- select the available driver with the highest trustworthiness rating as the driver.

14. The apparatus of claim 11, wherein to transmit the instructions to cause one or more security procedures to be performed, the processing device is to instruct the driver to implement a higher security protocol with respect to the user responsive to the trustworthiness rating of the user being below a predetermined threshold.

15. The apparatus of claim 14, wherein the passenger trustworthiness data further indicates one or more of a total distance the user has traveled with the transportation system, a number of successful trips the user has taken with the transportation system, or an average rating given to the user by drivers of the transportation system.

16. At least one computer-readable non-transitory media comprising one or more instructions that when executed by a processing device, cause the processing device to perform operations comprising:
- receiving, from a passenger computing device associated with a user, a transportation request comprising a pickup location;
- generating a trustworthiness rating of the user by identifying, from a data store, passenger trustworthiness data indicating a length of time that the user has been using a transportation system, wherein generating the trustworthiness rating of the user is based on the passenger trustworthiness data and on the length of time that the user has been using the transportation system;
- matching the user to a driver of a pool of drivers based on the trustworthiness rating of the user; and
- transmitting, to a driver computing device associated with the driver, navigational data to direct the driver to the pickup location and
- transmitting, to the driver computing device, instructions to cause one or more security procedures to be performed based on the trustworthiness rating of the user, wherein the transportation request is to be fulfilled responsive to the user passing the one or more security procedures.

17. The at least one computer-readable non-transitory media of claim 16, wherein the operations further comprise:
- determining a trustworthiness rating for the driver, wherein matching the user to the driver is further based on the trustworthiness rating of the driver.

18. The at least one computer-readable non-transitory media of claim 16, wherein:
generating the trustworthiness of the user comprises determining that the transportation request is a first-time transportation request from the user; and
matching the user to the driver comprises:
- searching the pool of drivers to determine an available driver with a highest trustworthiness rating; and
- selecting the available driver with the highest trustworthiness rating as the driver.

19. The at least one computer-readable non-transitory media of claim 16, wherein transmitting the instructions to cause one or more security procedures to be performed comprises instructing the driver to implement a higher security protocol with respect to the user responsive to the trustworthiness rating of the user being below a predetermined threshold.

20. The at least one computer-readable non-transitory media of claim 16, wherein the passenger trustworthiness data further indicates one or more of a total distance the user has traveled with the transportation system, a number of successful trips the user has taken with the transportation system, or an average rating given to the user by drivers of the transportation system.

* * * * *